United States Patent [19]

Ingram

[11] Patent Number: 4,981,227
[45] Date of Patent: Jan. 1, 1991

[54] GARMENT DISPLAY RACK

[75] Inventor: Elwin M. Ingram, Hialeah, Fla.

[73] Assignee: Capitol Hardware Manufacturing Co., Inc., Chicago, Ill.

[21] Appl. No.: 183,608

[22] Filed: Apr. 19, 1988

[51] Int. Cl.$^5$ ............................................. A47B 47/00
[52] U.S. Cl. .................................... 211/204; 211/123; 211/208
[58] Field of Search ............... 211/123, 190, 191, 207, 211/204, 196, 208; 403/108

[56] References Cited

U.S. PATENT DOCUMENTS

| 3,071,253 | 1/1963 | Walsh et al. | 211/204 |
| 3,507,402 | 4/1970 | Barbee | 211/204 |
| 4,181,230 | 1/1980 | Acuff | 211/208 |
| 4,380,298 | 4/1983 | Harig | 211/204 X |

Primary Examiner—Alvin C. Chin-Shue
Assistant Examiner—Sarah A. Lechok
Attorney, Agent, or Firm—Wallenstein, Wagner & Hattis, Ltd.

[57] ABSTRACT

A pair of vertical telescoping members are progressively lockable into any relative position to vary the overall length thereof by special locking hardware mounted on the inner member where it is not visible. The hardware includes a locking member movable in part by inertial forces between a released or unlocking position and a locking position where it forms a one way slip clutch with the inner surface of the outer member which permits the inner member to be raised which then preferably shifts the locking member into a release position. The inner member is moved further up or down to its desired position. Whenever the inner member is released, it is preferred that gravity will cause the inner member to move suddenly downwardly a small distance quickly to cause the locking portion of this member to move to its locking position.

29 Claims, 3 Drawing Sheets

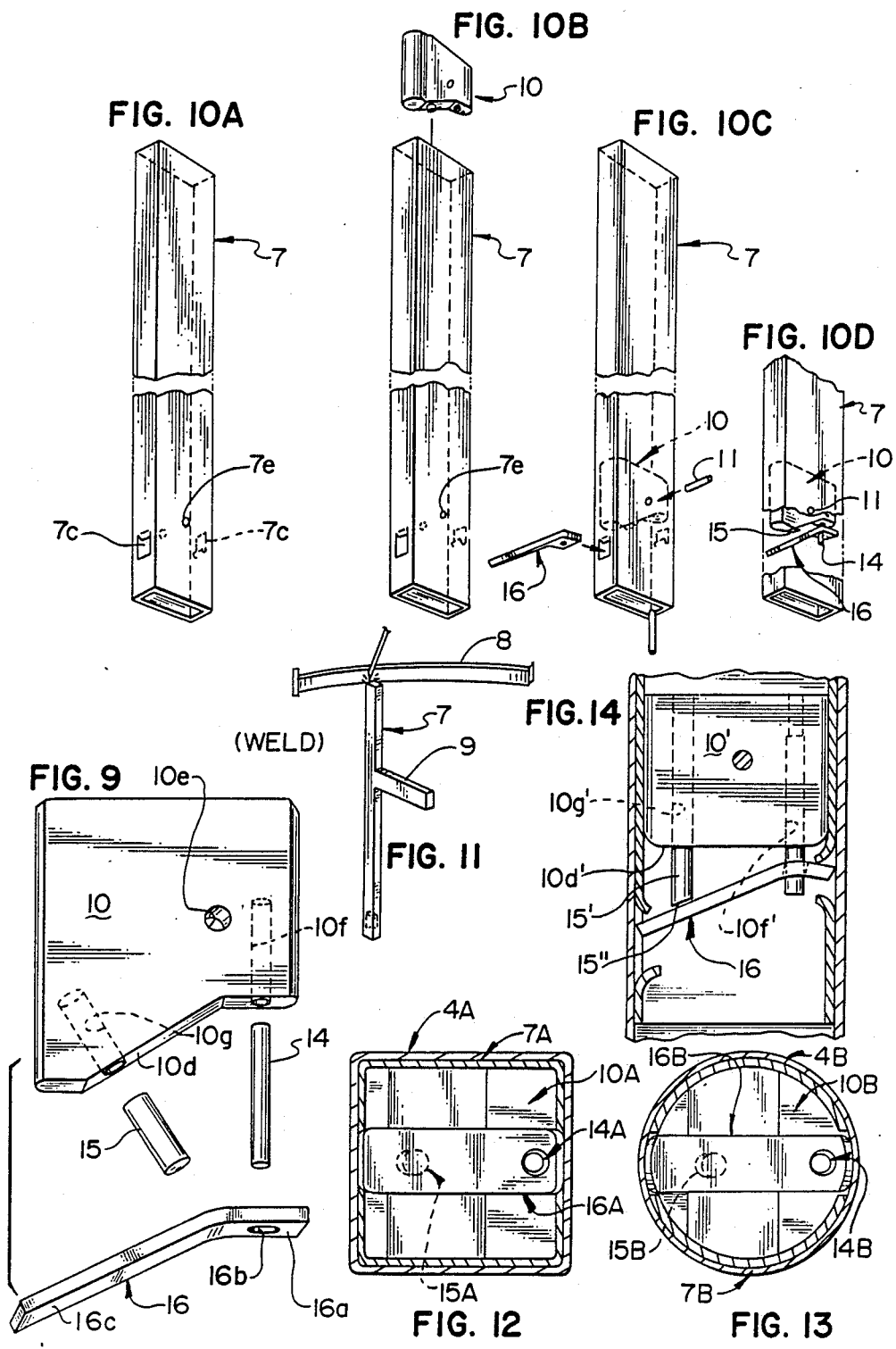

GARMENT DISPLAY RACK

DESCRIPTION

1. Technical Field

This invention relates generally to free-standing hangrod systems of the type commonly found in the clothing sections of retail, discount and wholesale stores. More particularly, the invention relates to the type of free-standing garment display rack which generally has one or more upstanding elongated, outer tubular members supported from a roller-carrying base and a corresponding number of depending elongated, hangrod-carrying members telescoping into the upstanding tubular members and adjustable in elevation therein. The present invention provides a unique means for progressively adjusting the vertical positions of the hangrod-carrying members, or any other vertical members, telescoping into outer tubular members. In its broadest aspects, the invention therefore is applicable to any product having upstanding telescoping members like canes, walkers, etc., to be adjusted in elevation, although many specific aspects are primarily applicable to free standing garment support racks.

2. Background Prior Art

It is most common in the prior art to adjust the elevation of a vertical rod extending into an outer tubular member by use of a horizontally extending locking pin which can be selectively passed between an aperture in the outer tubular member into any one of a number of vertically spaced apertures in the inner member. Adjustment is achieved by withdrawing the locking pin from the inner member, then adjusting the elevation of the inner member to a position where the pin can enter a new aligned aperture in the inner member. Such an elevation adjusting means is unattractive and therefore undesirable for garment display rack applications. Also, it is inconvenient to use because of the limited number of vertical positions of adjustment determined by the number of adjusting apertures provided in the inner member. Also, such a locking pin is an especially inconvenient adjusting means where the hangrod-carrying portion of a garment display rack includes a number of secured together depending hangrod-carrying members fitting into a number of outer tubular members, where the vertical adjustment of all of the depending members must be simultaneously carried out.

Prior to the present invention, there was also developed a means for adjustably locking an inner member telescoping within an outer member by means including rollers spring-urged outwardly against the inner surface of the outer member. An adjusting member extended to the exterior of the inner member. Movement imparted to this adjusting member momentarily collapsed the position of the rollers so that the inner member could be moved to a desired elevation. Release of this adjusting member caused the rollers to expand outwardly to make contact against the inner wall of the outer member to hold the inner member in its new adjusted position. The mechanism involved did not always operate reliably due to the manner in which it was constructed.

The present invention provides a unique reliable arrangement of inner and outer vertically oriented telescoping members where the inner member can be adjusted in the outer member into almost an infinite number of different vertical positions, and preferably with locking hardware which is invisible from the exterior of the outer tubular member, so as to be especially useful in garment display racks. This unique hardware is also useful as a replacement for the spring-urged roller hardware just described since it is a much simpler and more reliable design. More importantly, this unique hardware permits an adjustment of the telescoping members in a manner which does not need to use any manually operable members, which is the preferred environment for this unique hardware.

As will appear, the preferred locking hardware is constructed in a manner which can be easily and economically assembled onto the bottom end of the inner depending telescoping members, and enables the user to adjust the elevation of all the inner members simultaneously quickly and easily. The uniqueness of the preferred locking hardware requires that the locking hardware and the other elements involved be assembled in a particular sequence. Thus, the sequence in which the elements of the invention are assembled constitutes a method aspect of the present invention.

SUMMARY OF THE INVENTION

The preferred locking hardware of the invention includes a locking means preferably carried on the inside of the bottom end portion of each inner member. This locking means is supported preferably for movement in each inner member so that at least one end portion thereof is movable to an extreme locking position where it lockingly engages with the inner surface of the outer tubular member when the inner member is accelerated downwards This end of the locking means is also movable by the force of gravity to an extreme release position where it is released from engagement with the inner surface of the outer tubular member upon upward movement of the outer tubular member, so that no locking action can take place.

When the inner member is moved upwardly, the locking end of the locking means moves in a direction where it will assume a release position, where it leaves contact with the inner surface of the outer tubular member. The inner member may then be moved in an upward or downward direction to any desirable position. At any time, when the inner member is released by the operator, whether it is the weight, of the inner member is such that inertial force will cause it to suddenly move, so that the inertial effects will cause the locking end of the locking means to assume its locking position.

In the most preferred form of the invention, the locking means is a narrow, elongated angular armature which has a head portion with a slightly over-sized hole loosely received by a pin depending from a support member anchored in place in the lower end of the inner tubular member. The armature member floats on the pin, so that it can rock or pivot and slide vertically on the pin. The support member also preferably carries on its bottom end a magnet which exerts an upward pulling force on the upper end of an opposite tail end portion of the armature, which is made of a magnet attracting material. While the invention is operable without the magnet, the reliability of its operation is greatly enhanced thereby.

The tail end of the preferred armature in its locking position angles downwardly so that it is forced more tightly into frictional engagement with the inner wall of the outer tubular member as the inner member is drawn downwardly by the force of gravity. The inner member is preferably provided with a portion which engages the top of the head portion of the armature, to pivot the armature in a direction which keeps the tail end of the armature engaged against the inner wall of the outer tubular member in its raised or locked position. The end of the head portion of the armature also then preferably makes a similar locking engagement with the inner surface of the outer tubular member.

The inner member is preferably also provided with a portion which, when the inner member is moved upward, engages the bottom of the head portion of the armature to aid in pivoting the tail end portion of the armature down to its release position. The pivoting of the armature then also releases the end of the head portion from engagement with the inner surface of the outer tubular member.

Since the locking action takes place at the inner face between one or more ends of the armature member carried on the inside of each inner member and the inner surface of a wall of the outer member, the locking hardware is obscured from view. Therefore, it does not adversely affect the attractive appearance of the outer surfaces of the visible portions of the telescoping members, which can be plated or otherwise covered with an attractive coating applied over a continuous outer surface thereof. Also, because of the manner of operation of the invention described above, the present invention provides a quick and easy progressive adjustment of one or a number of connected inner members telescoping into one or more outer tubular members.

Other details of the preferred support member, armature, pin and magnet constituting other specific aspects of the invention will be described in the body of the specification. The manner in which these parts are sequentially mounted in place in the inner member constitutes a method aspect of the invention.

It should be understood that the exemplary forms of the invention to be described can be modified substantially without deviating from the broader aspects of the invention. However, the specific, preferred forms of the invention constitute specific aspects of the invention. These will become apparent upon making reference to the specification to follow, the drawings and the claims.

DESCRIPTION OF DRAWINGS

FIG. 9 is an exploded view of the various parts of the locking hardware;

FIG. 10A shows one of the hangrod-carrying members in its finished plated form and prior to its assembly with the locking hardware of the invention and a hangrod;

FIG. 10B shows the first step in assembly of the locking hardware with the hangrod-carrying member shown in FIG. 10A before the hangrod is welded thereto, where an armature support member is being inserted into the top of the hangrod carrying member;

FIG. 10C shows the next steps in the assembly of the locking hardware into the hangrod-carrying member shown in FIG. 10B, where the armature support member shown in FIG. 11B has been moved into the bottom end portion of the hangrod-carrying member and an anchoring pin, an armature-supporting pin and the armature are sequentially moved into position on the support member;

FIG. 10D shows the completion of the assembly of the parts shown in FIG. 10C;

FIG. 11 shows a hangrod being attached to the hangrod-carrying member shown in FIG. 11D, prior to the assembly of that member with two other similar members, to form the upper hangrod-carrying assembly used in the rack of FIG. 1;

FIGS. 12 and 13 are horizontal sectional views through respectively square and cylindrical telescoping members, to which the present invention has been applied as the viewer looks upwardly in a section plane including the apertures of the inner member through which the armature extends; and FIG. 14 is a vertical sectional view of a hangrod-carrying member which includes a modified form of the locking hardware of the invention, wherein the shape of the armature support member and the end face of the magnet supported thereby are modified from that shown for the corresponding elements of the hardware in FIG. 9.

DESCRIPTION OF PREFERRED FORMS OF THE INVENTION SHOWN IN THE DRAWINGS

Figure 1:
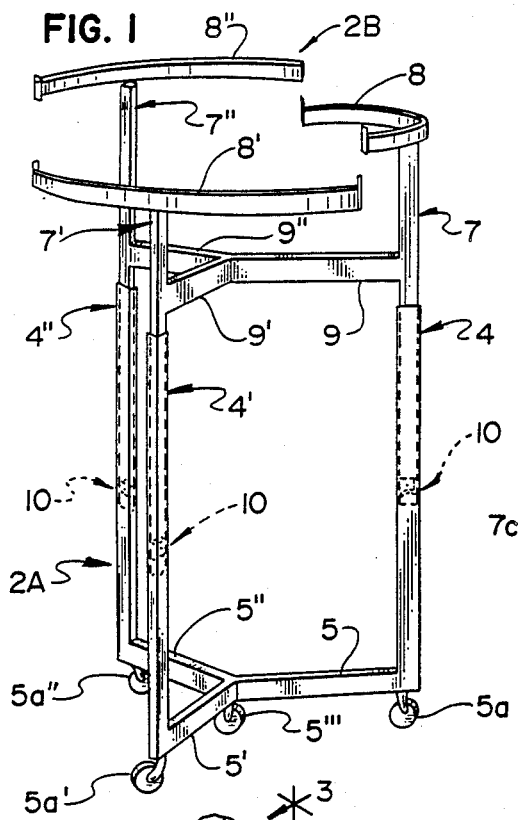
FIG. 1 is a perspective view of a garment display rack which has three depending hangrod-carrying members adjustably received in separate outer tubular members using the locking hardware of the present invention.

Referring now more particularly to FIG. 1, the adjustable rack thereshown comprises a lower roller-carrying base assembly 2A and a upper hangrod-carrying assembly 2B which may be formed for the most part from finished plated rectangular aluminum tubular stock. The upper assembly has three curved hangrods 8, 8', and 8" which occupy different segments of a circle and are located at three different elevations providing an unusually attractive rack. Garment-supporting hangers with hook necks are hung along these hangrods. The ends of each of these hangrods have stop shoulders for preventing the hangers from falling off the ends of the hangrods.

Each hangrod is carried on top of a depending tubular member, to be referred to as the inner tubular member 7, 7', or 7". The inner tubular members 7, 7', and 7" are interconnected by bracing arms 9, 9' and 9" which are welded together at the center of the rack and are suitably welded or otherwise secured to the inner sides of the inner tubular members 7, 7', and 7" before they are finish-plated. The upper assembly 2B is assembled to the bottom assembly 2A by inserting the bottom ends of the inner tubular members 7, 7', and 7" into the open upper ends of upstanding outer tubular members 4, 4', and 4" forming part of the bottom assembly 2A. The bottom ends of the outer tubular members 4, 4', and 4" are interconnected by bracing arms 5, 5', and 5", respectively, which are welded together at the center point of the rack and are also welded or otherwise suitably connected to the bottom ends of the outer tubular members before they are finish plated. The bracing arms 5, 5', and 5" carry on the bottom faces thereof rollers 5a, 5a', and 5a", respectively, and a center roller 5a'" may be provided at the point where the bracing arms 5, 5', and 5" come together at the center of the rack.

The present invention comprises hardware like that shown in FIG. 9 mounted at the bottom ends of each of the inner tubular members 7, 7', and 7". This unique hardware permits the simultaneous adjustment of the hangrod-carrying assembly 2B by the simple process of raising this assembly to any desired elevation. When the upper assembly is released, it will drop only a short distance. It is important that the inner tubular members 7, 7' and 7" are freely slidable within the outer tubular members 4, 4', and 4". After only this slight downward movement, the locking hardware to be described is moved by inertial effects into its locking condition, where the upper assembly 28 will remain in its substantially originally adjusted position, having dropped only about a sixteenth of an inch in the process.

It is believed that a rack which operates on the principle just described is unique. In the prior art racks of the type having two or more hangrod-carrying depending members, in order to be able to adjust the elevation of the hangrod-carrying assembly, it was necessary for one person first to individually remove locking pins passing through aligned apertures in the telescoping members while another person held the assembly in place. The person holding the assembly then moved it to a desired adjusted position, and the other person then inserted the pins into these a pair of aligned apertures in the telescoping members to hold the assembly in its adjusted position. The advantages of the present invention over this prior method of elevation adjustment is manifestly substantial, since only a single person is needed to adjust the elevation of the hangrod-carrying members quickly and easily, unlike the prior method required to do so. In the prior art telescoping structures described previously where outwardly spring urged rollers are mounted in each inner tubular member, operation of manually operable members were needed to release the rollers from their locking position.

Figure 2:
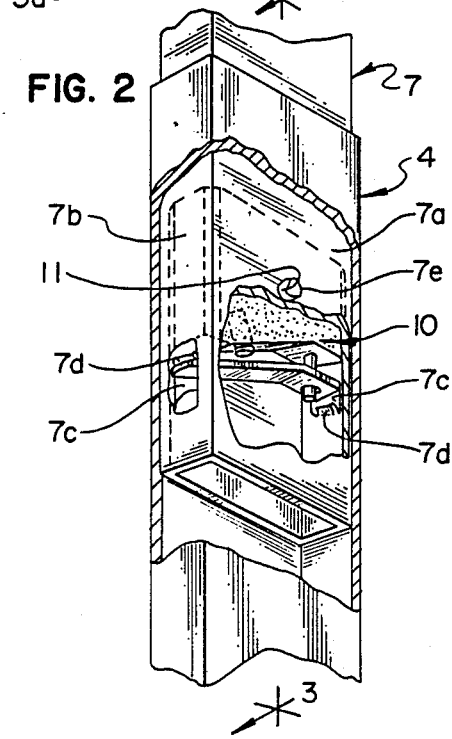
FIG. 2 is an enlarged, fragmentary, perspective view, partly broken away, showing the unique locking hardware of the present invention mounted in the bottom of one of the hangrod-carrying members shown in FIG. 1 telescoping within the open upper end of one of the outer tubular members extending upwardly from a roller-carrying base of the rack shown.
Figure 3:
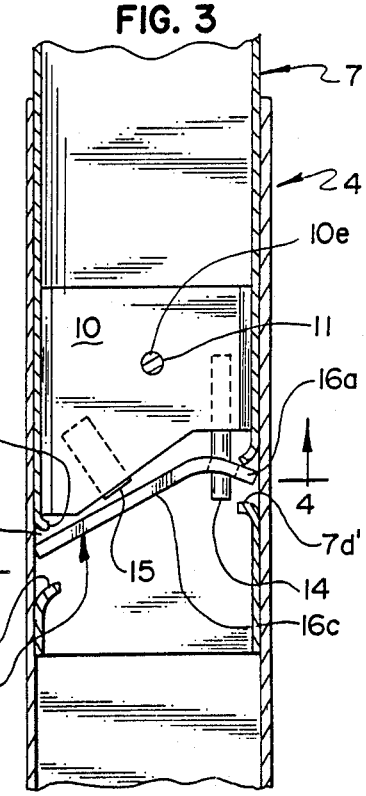
FIG. 3 is a vertical sectional view, taken along section line 3—3 in FIG. 2 showing the armature of the locking hardware in its locking position.

The unique locking hardware, similar to that shown in FIG. 9 in exploded form, is usable in place of this roller hardware and could be operated between locking and release positions by such manually operable members. However, such manually operable members are not needed. This hardware is anchored in the bottom end of each of the inner tubular members 7, 7' and 7". Referring also to FIGS. 2 and 3, this hardware includes support member 10 having a horizontal cross section which permits it to be initially inserted into and slidable freely along the interior of an inner tubular member 7, 7', or 7" when it is assembled inside this tubular member from the top thereof, as illustrated in FIGS. 10A and 10B. The assembly procedure will be later described. The support member 10 is anchored in place at the bottom end of this tubular member by an anchoring pin 11 passing through aligned holes 7e—7e in the opposite side walls 7a—7a of this inner tubular member and a similar aperture 10e in the support member 10. The support member 10 has a flat upper end and an irregularly-shaped bottom end including a short horizontal end surface 10c having a pin-receiving aperture 10f therein. The surface 10c merges with a downwardly inclining surface 10d having near the end portion thereof a cylindrical magnet-receiving recess 10g having an axis extending perpendicular to the inclined surface 10c so that the end face of a magnet to be supported therein will be generally parallel to the inclined surface 10c.

A cylindrical magnet 15 is friction-fitted or otherwise anchored within the recess 10g and the pin 14 is anchored in the aperture 10f with the pin depending a substantial distance below the surface 10c. The magnet 15 is shown projecting only a short distance from the inclined surface 10d. The support member 10 is preferably made of a non-magnetic material, such as a molded synthetic plastic material. Supported for a floating, rocking and sliding movement on the pin 14 is an armature member 16 also sometimes referred to as a locking means. This member is made of steel or other material which can be attracted toward the magnet 15. The armature has a short head portion 16a with a circular aperture 16b through which passes the depending pin 14. The pin 14 is also preferably of a cylindrical cross section, but of a smaller size than the aperture 16b.

One of the narrow, vertical end walls 7b of the inner tubular member 7 has near its bottom end a lower aperture 7c having an upwardly and inwardly extending tab 7e' defining its bottom margin and a downwardly and inwardly extending tab 7e defining its upper margin. The other vertical narrow end wall 7b has an upper aperture 7c' having an upwardly and inwardly extending tab 7d' defining its bottom margin and a downwardly and inwardly extending tab 7d defining its upper margin. The head portion 16a of the armature 16 is adapted to project through the upper aperture 7c'.

The head portion 16a of the armature confronts the flat surface 10c at the bottom of the support member 10 and can move up and down, slightly right and left, and pivot over the pin 14 extending therethrough. The head portion 16a of the armature merges with a relatively long tail portion 16c which angles downwardly to project into the lower aperture 7c' of the inner tubular member 7 and confronts the relatively long inclined surface 10d at the bottom of the support member 10. The bottom end of the magnet 15 projecting from the surface 10d applies an attracting force on the upper surface of the heel portion 16c of the armature.

Figure 7:
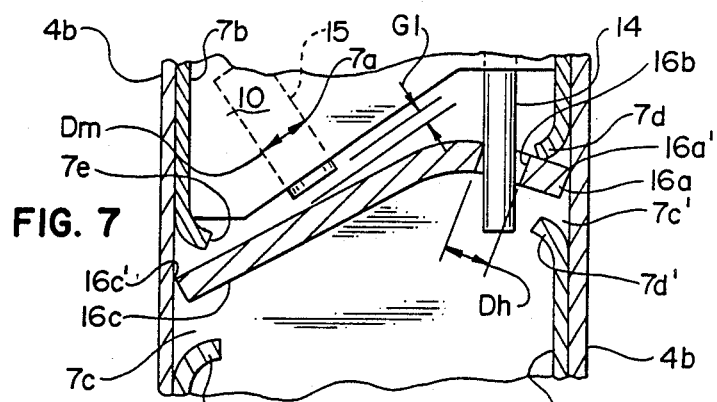
FIG. 7 is a view corresponding to FIG. 3, and shows the armature of the locking hardware in its locking position, but drawn to a larger scale so that some of the important dimensions of the exemplary form of locking hardware can be identified by reference characters appearing therein.
Figure 8:
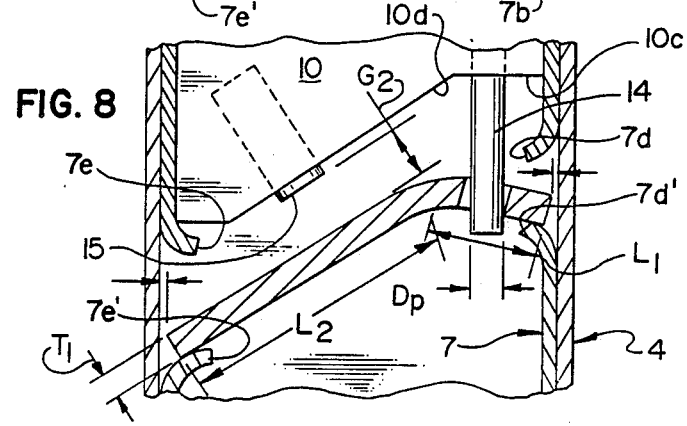
FIG. 8 is a view corresponding to FIG. 8, and shows the armature in its release position and other important dimensions of the locking hardware.

Reference should now be made more particularly to FIGS. 7 and 8 which are the most enlarged views showing respectively the uppermost extreme position of the armature 16, which is the locking position thereof, where the head and heel ends 16a' and 16c' thereof frictionally lockingly engage with the inner surfaces of the end walls 4b—4b of the outer tubular member 4. The tab 7d at the top of the upper aperture 7c' of the inner tubular member is shown engaging the top surface of the head portion 16a of the armature, so that accelerating the inner tubular member 7 in a downward direction will accelerate this head portion downwardly so that the heel portion 16c is inertially pivoted upwardly into tight frictional engagement with the inner surface of the left end wall 4b of the outer tubular member 4. The magnet 15 also exerts a force on the heel portion 16c which tends to keep the armature in its raised, locking position as shown. (While this magnet makes the operation of the locking hardware described more reliable, it is not necessary in accordance with the broadest aspect of the invention.) In the locking position of the armature 16, it is still shown as spaced a small distance G1 from the bottom face of the magnet 15. The armature shown is prevented from touching this magnet by the upper tab 7c at the top of aperture 7c and because the armature becomes locked in place before it can touch it.

Figure 5:
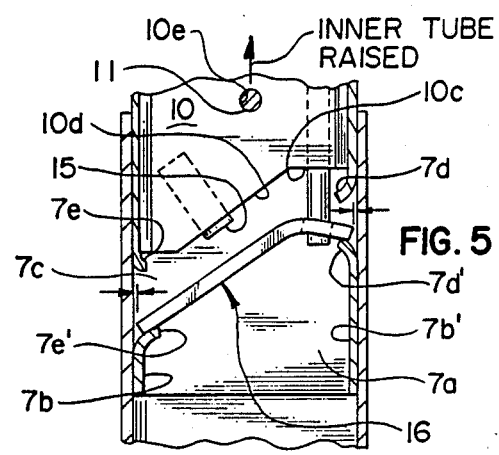
FIG. 5 is a view corresponding to FIG. 3 and which illustrates the movement of the armature of the locking hardware to its unlocking or release portion when the hangrod-carrying member shown is moved upward from its position shown in FIG. 3.
Figure 4:
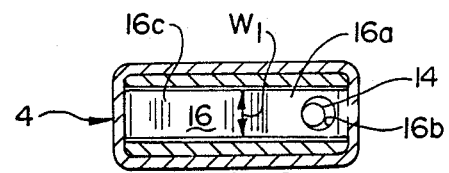
FIG. 4 is a horizontal section taken along section line 4—4 in FIG. 3.
Figure 6:
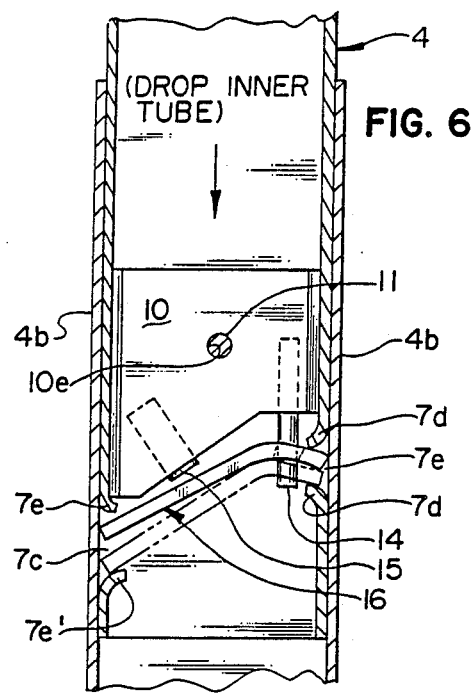
FIG. 6 is a view corresponding to FIG. 5, showing the return of the armature to its locking position by inertial effects when the hangrod-carrying member is suddenly accelerated downward from its upper position.

If the inner tubular member 7 is moved upwardly from its locking position shown in FIG. 6 the frictional forces coming into play will pivot the armature member in a direction to relieve this frictional force and to cause the armature member to pivot the pin 14 to assume the release position shown in FIGS. 5 and 8.

When the armature heel is in its lower release or unlocking position shown in FIGS. 5 and 8, the inner tubular member can then be raised any speed or slowly lowered to a desired elevation since this slow, downward movement will not shake the armature from its lowered release position. However, as soon as the user releases his grasp on the inner tubular member 7, since this tubular member is designed to freely move within the outer tubular member 4, the force of gravity will suddenly cause the inner tubular member to drop quickly, when the inertial forces involved will then cause the heel and head portions of the floating armature 16 to assume their locking positions shown in FIGS. 3 and 8. As previously indicated, this action generally occurs after the inner tubular member drops only approximately 1/16th of an inch from the point when the user releases his grasp on that member. The magnet 15 aids the upward movement of the armature and minimizes this dropping distance.

In one operable embodiment of the invention just described, the locking hardware parts had the following specifications and dimensions indicated in FIGS. 8 and 9:

Armature material-0-1 steel
Armature tail length (L2) 1-1/8"
Armature head length (L1) 9/16"
Armature thickness (T1) 0.092"
Armature width (W1) 0.365"
Armature to magnet spacing (G1) in locking condition 0.106"
Armature to magnet spacing (G2) in released condition 0.200"
Armature head aperture diameter (Dh) 0.206"
Magnet material-Alnico 3/16" round×¾" long
Magnet diameter (Dm) 0.187"
Support pin diameter (Dp) 0.125"

Reference should now be made to FIGS. 10A–10D which illustrates the sequence of assembly of the locking hardware in the inner tubular member 7. The same procedure is used to place the locking hardware into the other inner tubular members 7' and 7". This is done before these inner tubular members are interconnected by welding the inner ends of the bracing arms 9, 9', and 9" together, and before the attachment of the hangrods to the inner tubular member or the finish-plating thereof. The first step in the fabrication process is to weld a bracing arm 9, 9' or 9" to the inner tubular members 7, 7', or 7" and to form the apertures 7c and 7c' at the bottom end thereof. The bracing arms are the same size as the inner tubular members so that when they are welded and subsequently finish-plated the interconnections between each bracing arm and its inner tubular member is a smooth, unblemished plated surface. Upon the completion of a finished-plating operation, a support member 10 oriented with its inclined bottom surface 10d facing toward what is to be the open top end of an inner tubular member 7 as illustrated. It is then moved toward what will be the bottom end thereof where it is at a point near the apertures 7c and 7c' and the anchoring aperture 10e thereof is aligned with aperture 7e—7e formed in the opposite sides of the inner tubular member. An anchor pin 11 is passed through the apertures 7e—7e in the inner tubular member and the anchoring aperture 10e of the support member 10 and in any way anchored therein, as by a friction fit therein.

Next, the pin 14 is inserted into the pin-receiving aperture 10f, the pin being anchored in place by a friction fit or a suitable adhesive. The next operation in the assembly is the insertion of the armature 16 into one of the apertures 7c or 7c' of the inner tubular member so that the aperture 16b in the head portion 16a of the armature is aligned with the pin-receiving recess 10f. Then the pin 14 is passed through aperture 16b into the recess 10f of the support member with which it makes a friction fit. This completes the assembly of the locking hardware of the invention as is shown in FIG. 10D.

After all of the inner tubular members have the locking hardware mounted therein, the next step in the assembly procedure of the rack is to weld or otherwise secure the curved hangrods 8, 8' and 8" to the inner faces of the inner tubular member 7, 7', and 7", as illustrated in FIG. 11. The bracing arms 9, 9', and 9" are then suitably connected together at their outer ends, as by welding or otherwise, as shown in FIG. 1.

The invention is applicable to telescoping members having square and cylindrical cross sections, as illustrated respectively in FIGS. 12 and 13. Corresponding parts of these telescoping members and the locking hardware therein are shown using reference numerals corresponding to those used in the form of the invention just described by adding the alphabet characters A and B, respectively, and thus further description of their operation and construction need not be made. Suffice it to say, the shape of the support member and the armature are modified to suit the particular cross sectional areas of the tubular members involved.

FIG. 14 shows an embodiment of the invention which modifies the stage of the support member 10 to enable it to be more economically molded of synthetic plastic material. Thus, the modified support member 10' has a horizontal flat bottom end 10d' with a cylindrical magnet-receiving recess 10g' formed therein which extends vertically. A generally cylindrical magnet 15' is piece-fitted in the recess 10g'. The magnet has an inclined end face 15" generally parallel to the inclination of the heel portion 16c of the armature 16 when it is in its upper locking position, as illustrated in FIG. 15.

It is apparent from the description of the various forms of the present invention that the unique locking hardware of the present invention results in a garment rack or other product using vertically extending telescoping members whose overall length is adjustable by means which do not interfere with the exterior appearance of the product. Thus, all of this hardware is hidden within the confines of the telescoping members involved. More importantly, the inner tubular members are progressively adjustable simultaneously to practically any position within the outer tubular members in the quick and easy manner previously described.

While the invention has been described with reference to preferred embodiments thereof, it will be understood by those skilled in the art that various changes may be made and equivalents may be substituted for elements thereof without departing from the broader aspects of the invention. Also, it is intended that broad claims not specifying details of a particular embodiment disclosed herein as the best mode contemplated for carrying out the invention should not be limited to such details. Furthermore, while, generally, specific claimed details of the invention constitute important specific aspects of the invention in appropriate instances even the specific claims involved should be construed in light of the doctrine of equivalents.

I claim:

1. In a free standing garment display rack having a lower floor-supported base having one or more upwardly extending outer tubular members each open at the top thereof and having an inner surface, and an upper hangrod-carrying assembly having a depending vertical member telescoping into the open top of each upwardly extending outer tubular member of said floor-supported base, the improvement comprising means on each depending member for releasably locking it approximately in any vertical adjusted position within the associated outer tubular member so that the overall height of the telescoping members can be gradually progressively varied and locked into practically all adjustable positions, said means comprising: locking means movable to a locking position where a first portion thereof makes a locking engagement with said inner surface of said outer member, and support means for said locking means for supporting said first portion of said locking means for movement to a released position responsive solely to said upper hangrod-carrying assembly being raised, in which released position said first portion of said locking means is disengaged with said inner surface of said outer tubular member, and for supporting said first portion of said locking means for movement from said released position to said locking position responsively to downward acceleration of the raised hangrod-carrying assembly, in which locking position said first portion of said locking means lockingly engages with said inner surface of said outer tubular member, said first portion disengaging from said inner surface of said outer tubular member to form a one-way clutch when said upper hangrod-carrying assembly is raised.

2. The free standing garment rack of claim 1 wherein said rack has at least two depending members on said hangrod-carrying assembly telescoping into a pair of outer tubular members of said lower floor supported assembly.

3. In combination with a pair of telescoping members, one such member being an outer tubular member having an inner surface and the other being an inner member fittable and slidable inside of said outer tubular member and which is to be moved and locked in a position therein so it projects varying amounts from the outer member to gradually progressively vary and fix the overall length thereof; the improvement in locking means movable to a locking position where a first portion thereof makes a locking engagement with said inner surface of said outer member, said locking means being carried on said inner member for releasably locking said inner member approximately in any adjusted position within said outer tubular member so that the overall length of the telescoping members can be gradually progressively varied, and locked into practically all adjustable positions, said means comprising: locking means, and support means for said locking means for supporting said first portion of said locking means for movement to a released position responsively to movement of said inner member in a first direction, in which released position said first portion of said locking means is disengaged from said inner surface of said outer tubular member, and for supporting said first portion of said locking means for movement from said released position to a locking position responsively to accelerated movement of said inner member in the opposite direction, in which locking position said first portion of said locking means lockingly engages with said inner surface of said outer tubular member, but disengages from said inner surface of said outer tubular member when said inner member is moved in said first direction.

4. The combination of claim 3 wherein said locking means is supported on the bottom of the associated support means for movement between a lowered position, which is said released position, and an upper position, which is said locking position 5. The combination of claim 4 wherein said locking means is floatingly supported on said support means.

6. The combination of claim 4 wherein said inner member is a vertical member telescoping into the top of said outer tubular member which is also vertically oriented, and wherein said first direction is upward, the inner member falling under the force of gravity when the inner member is released by the user after being raised, the raising of said inner member in a locked condition causing said first portion of said locking means to move downward into said lowered released position, downward acceleration of said inner member causing said first portion of said locking means to be moved to said raised locking position.

7. In combination with a pair of upstanding telescoping members, one such member being an outer upstanding elongated tubular member having an inner surface and the other being an inner upstanding elongated member fittable into the top of and slidable inside of said outer tubular member and which is to be moved up and down and locked in a position therein so it projects varying amounts from the outer member to vary the overall length thereof; the improvement in means carried on said inner member for releasably locking said inner member approximately in any adjusted position within said outer tubular member so that the overall length of the telescoping members can be progressively varied, said means comprising: locking means movable to a locking position where a first portion thereof makes a locking engagement with said inner surface of said outer member, and support means for said locking means for supporting said first portion of said locking means for movement to a released position responsively to upward movement of said inner member in which released position at least said first portion of said locking means is disengaged from said inner surface of said outer tubular member, and for supporting said first portion of said locking means for movement from said released position to said locking position responsively to downward acceleration of said inner member in which locking position at least said first portion of said locking means lockingly engages with said inner surface of said outer tubular member, but slips along said inner surface of said outer tubular member to form a one-way slip clutch when moved upward.

8. The combination of claim 7 wherein said locking means is an elongated member having a head portion which is supported for rocking movement on said support means, said first portion of said locking means being a tail portion on said locking means extending from said head portion at a downwardly extending angle, to engage the inner surface of said outer tubular member at an angle which prevents the downward movement of said inner member when said first portion of said locking means is in its upper position constituting the locking position thereof.

9. In combination with a pair of upstanding telescoping members, one such member being an outer upstanding elongated tubular member having an inner surface and the other being an inner upstanding elongated member fittable into the top of and slidable inside of said outer tubular member and which is to be moved up and down and locked in a position therein so it projects varying amounts from the outer member to vary the overall length thereof; the improvement in means carried on said inner member for releasably locking said inner member approximately in any adjusted position within said outer tubular member so that the overall length of the telescoping members can be progressively varied, said means comprising: locking means, and support means for said locking means for supporting a first portion of said locking means for movement to a released position responsively to upward movement of said inner member in which released position said first portion of said locking means is disengaged from said inner surface of said outer tubular member, and for supporting said first portion of said locking means for movement from said released position to a locking position responsively to downward acceleration of said inner member in which locking position said first portion of said locking means lockingly engages with said inner surface of said outer tubular member, but disengages from said inner surface of said outer tubular member to form a one-way clutch when moved upward, said locking means being an elongated member having a head portion which is supported for rocking movement on said support means, said first portion of said locking means being a tail portion on said locking means extending from said head portion at a downwardly extending angle, to engage the inner surface of said outer tubular member at an angle which prevents the downward movement of said inner member when said first portion of said locking means is in its upper position constituting the locking position thereof, said first portion of said locking means being maintained in said upper locking position when the inner member is at rest in part by the frictional engagement of the end of said tail portion against the inner wall of said outer tubular member, and magnet means for imposing an upward force on said first portion of said locking means, said magnetic force aiding acceleration-induced forces to facilitate the movement of said first portion of said locking means from said lowered released position to its raised locking position when the inner member is moved suddenly downward.

10. In a free standing garment display rack having a lower floor-supported base having one or more upwardly extending outer tubular members each open at the top thereof and having an inner surface, and an upper hangrod-carrying assembly having a depending vertical member telescoping into the open top of each upwardly extending outer tubular member of said floor-supported base, the improvement comprising means on each depending member for releasably locking it approximately in any vertical adjusted position within the associated outer tubular member so that the overall height of the telescoping members can be gradually progressively varied, and locked into practically all adjustable positions, said means comprising: locking means movable to a locking position where a first portion thereof makes a locking engagement with said inner surface of said outer member, and support means for said locking means for pivotally supporting said first portion of said locking means for movement to a released position responsively to said upper hangrod-carrying assembly being raised, in which released position said first portion of said locking means is disengaged from said inner surface of said outer tubular member, and for pivotally supporting said first portion of said locking means for movement from said released position to a locking position responsively to downward acceleration, in which locking position said first portion of said locking means lockingly engages with said inner surface of said outer tubular member, but disengages from said inner surface of said outer tubular member when said inner member is moved in said first direction, said locking means being pivotally mounted on said support means, and said first portion of said locking means being on one side of the pivotally mounted portion thereof, and said inner member having a first shoulder-forming means which engages the portion of said locking means on the opposite side of said pivotally mounted portion when said inner member is moved upward, to aid in the desired movement of said first portion of the locking means between said positions.

11. The garment display rack or combination of claim 1, 3, or 8 wherein said locking means is mounted on the inside of each depending or inner member, and said first portion of each locking means passes through an aperture in the wall of said inner member so it can contact the inner surface of said outer tubular member.

12. In combination with a pair of telescoping members, one such member being an outer tubular member having an inner surface and the other being an inner member fittable and slidable inside of said outer tubular member and which is to be moved and locked in an position therein so it projects varying amounts from the outer member to vary the overall length thereof; the improvement in means carried on said inner member for releasably locking said inner member approximately in any adjusted position within said outer tubular member so that the overall length of the telescoping members can be progressively varied, said means comprising: locking means, and support means for said locking means for supporting at least a first portion of said locking means for movement to a released position responsively to movement of said inner member in a first direction, in which released position at least said first portion of said locking means is disengaged from said inner surface of said outer tubular member, and for supporting at least said first portion of said locking means for movement from said released position to a locking position responsively to accelerated movement of said inner member in the opposite direction, in which locking position at least said first portion of said locking means lockingly engages with said inner surface of said outer tubular member, but disengages from said inner surface of said outer tubular member when said inner member is moved in said first direction, said locking means being pivotally mounted on said support means, and said first portion of said locking means being on one side of the pivotally mounted portion thereof, and said inner member having a first shoulder-forming means which engages the portion of said locking means on the opposite side of said pivotally mounted portion when said inner member is moved upward, to aid in the desired movement of said first portion of the locking means between said positions.

13. In combination with a pair of telescoping members, one such member being an outer tubular member having an inner surface and the other being an inner member fittable and slidable inside of said outer tubular member and which is to be moved and locked in a position therein so it projects varying amounts from the outer member to vary the overall length thereof; the improvement in means carried on said inner member for releasably locking said inner member approximately in any adjusted position within said outer tubular member so that the overall length of the telescoping members can be progressively varied, said means comprising: locking means, and support means for said locking means for supporting a first portion of said locking means for movement to a released position responsively to movement of said inner member in a first direction, in which released position said first portion of said locking means is disengaged from said inner surface of said outer tubular member, and for supporting said first portion of said locking means for movement from said released position to a locking position responsively to accelerated movement of said inner member in the opposite direction, in which locking position said first portion of said locking means lockingly engages with said inner surface of said outer tubular member, but disengages from said inner surface of said outer tubular member when said inner member is moved in said first direction, said locking means being pivotally mounted on said support means, first portion of each locking means being on one side of the pivotally mounted portion thereof, and said inner member has a pair of shoulder-forming means which engage portions of said locking means on the opposite side of said pivotally mounted portion when said inner member is moved in the desired direction, to aid in the desired movement of said first portion between said positions.

14. In combination with a pair of telescoping members, one such member being an outer tubular member having an inner surface and the other being an inner member fittable and slidable inside of said outer tubular member and which is to be moved and locked in a position therein so it projects varying amounts from the outer member to vary the overall length thereof; the improvement in means carried on said inner member for releasably locking said inner member approximately in any adjusted position within said outer tubular member so that the overall length of the telescoping members can be progressively varied, said means comprising: locking means, and support means for said locking means for supporting at least a first portion of said locking means for movement to a released position responsively to movement of said inner member in a first direction, in which released position said first portion of said locking means is disengaged from said inner surface of said outer tubular member, and for supporting said first portion of said locking means for movement from said released position to a locking position responsively to accelerated movement of said inner member in the opposite direction, in which locking position said first portion of said locking means lockingly engages with said inner surface of said outer tubular member, but disengages from said inner surface of said outer tubular member when said inner member is moved in said first direction, said support means having a pin which passes loosely through said locking means so as to permit said locking means to pivot and slide relative thereto.

15. The combination of claim 9 wherein said support means has a first recess, a pin anchored in said recess and passing loosely through said locking means so as to permit said locking means to pivot or slide relative thereto, and a second recess in said locking support member, said magnet means being anchored in said second recess.

16. The combination of claim 8 wherein said inner member is a vertical member telescoping into the top of said outer tubular member which is also vertically oriented, and wherein said first direction is upward, said inner member has a hollow interior receiving said support means, said support means has a horizontal anchoring aperture, said inner member has horizontal apertures aligned with said anchoring aperture of said support means, and an anchoring pin passing through said horizontal apertures to anchor said support member in the hollow interior of said inner member.

17. The garment display rack or combination of claim 1, 3, or 8 wherein said depending or inner member is a tubular member having a vertical passageway extending the full length thereof, said depending or inner tubular member has apertures in the opposite sides thereof into which opposite ends of said locking means extend, frictionally to engage with the opposite inner surfaces of said outer tubular member, to provide a pair of locking portions which simultaneously lockingly engage the opposite inner surfaces of said outer tubular member.

18. The garment display rack or combination of claim 1, 3, or 8 wherein said locking means has opposite ends which extend tot he opposite inner surfaces of said outer tubular member, simultaneously to engage the same in the locking positions thereof.

19. The garment display rack or combination of claim 12 wherein said depending or inner member has apertures on opposite sides thereof, said locking means being an elongated member projecting into said apertures, and said shoulder-forming means being at the margin of one of said apertures.

20. In combination with a pair of telescoping members, one such member being an outer tubular member having an inner surface and the other being an inner member fittable and slidable inside of said outer tubular member and which is to be moved and locked in a position therein so it projects varying amounts from the outer member to vary the overall length thereof; the improvement in means carried on said inner member for releasably locking said inner member approximately in any adjusted position within said outer tubular member so that the overall length of the telescoping members can be progressively varied, said means comprising: locking means, and support means for said locking means for supporting a first portion of said locking means for movement to a released position responsively to movement of said inner member in a first direction, in which released position said first portion of said locking means is disengaged from said inner surface of said outer tubular member, and for supporting said first portion of said locking means for movement from said released position to a locking position responsively to accelerated movement of said inner member in the opposite direction, in which locking position said first portion of said locking means lockingly engages with said inner surface of said outer tubular member, but disengages from said inner surface of said outer tubular member when said inner member is moved in said first direction, and wherein said locking means is supported on the bottom of the associated support means for movement between a lowered position, which is said released position, and an upper position, which is said locking position, said inner member being a tubular member, said locking means and support means being supported in said inner tubular member near one end thereof, said inner tubular member having an aperture on at least one side thereof, there being at least one tab means at an end margin of said aperture projecting into said inner tubular member, said support means being a member slidable into said inner tubular member from the opposite end thereof, and anchoring means for anchoring the support member in place beyond said apertures in the direction of said opposite end.

21. The combination of claim 20 wherein said support means has a pin projecting therefrom, said locking means having a head portion pivotably supported around said pin and being adjacent said aperture, said head portion terminating in a heel portion which extends into another aperture on the opposite side of said inner member, the outer end margins of said apertures being defined by tab means projecting inwardly into the depending or inner tubular member and preventing the elongated locking means from dropping out of said end of said depending or inner tubular member.

22. In combination with a pair of upstanding telescoping members, one such member being an outer upstanding elongated tubular member having an inner surface and the other being an inner upstanding elongated member fittable into the top of and slidable inside of said outer tubular member and which is to be moved up and down and locked in a position therein so it projects varying amounts from the outer member to vary the overall length thereof; the improvement in means carried on said inner member for releasably locking said inner member approximately in any adjusted position within said outer tubular member so that the overall length of the telescoping members can be progressively varied, said means comprising: locking means, and support means for said locking means for supporting a first portion of said locking means for movement to a released position responsively to upward movement of said inner member in which released position said first portion of said locking means is disengaged from said inner surface of said outer tubular member, and for supporting said first portion of said locking means for movement from said released position to a locking position responsively to downward acceleration of said inner member in which locking position said first portion of said locking means lockingly engages with said inner surface of said outer tubular member, but disengages from said inner surface of said outer tubular member to form a one-way clutch when moved upward, said locking means being a elongated member having a head portion which is supported for rocking movement on said support means, said first portion of said locking means being a tail portion on said locking means extending from said head portion at a downwardly extending angle, to engage the inner surface of said outer tubular member at an angle which prevents the downward movement of said inner member when said first portion of said locking means is in its upper position constituting the locking position thereof, said support mans being a member anchored in said inner member, said first portion of said locking means being maintained in said upper locking position when the inner member is at rest in part by the frictional engagement of the end of said tail portion against the inner wall of said outer tubular member, the bottom end of said support means being a horizontal surface having a first magnet-receiving recess, and magnet means anchored in said recess and imposing an upward force on said first portion of said locking means, said magnetic force aiding acceleration-induced forces to facilitate the movement of said first portion of said locking means from said lowered released position to its raised locking position when the inner member is accelerated suddenly downward and said magnet means having a bottom face which angles downwardly in a direction so that its surface is generally parallel to, and confronts the tail portion of, said locking means.

23. A method of making and assembling a pair of telescoping members with an adjustable overall height, one of said members being an outer upstanding, elongated tubular member, the other of said members being an inner upstanding elongated tubular member fittable and fully slidable inside of said outer tubular member, the method comprising the steps of forming on the bottom end of said inner tubular member at least one aperture with inwardly projecting tab means at the bottom margin of said aperture, providing a support member which is slidable into said inner tubular member from the top thereof, placing said support member in the top of said inner tubular member and sliding the same to the bottom end thereof to a point above said aperture, anchoring the support member in place thereat, and inserting an elongated locking member into said inner tubular member through said aperture and mounting the same on the bottom of said support member so that a first portion of said elongated locking member is moved with the raising of said inner tubular member into a release position where said first portion is disengaged with the inner surfaces of said outer tubular member, and so that with the sudden downward acceleration of said inner tubular member, said first portion of said locking means assumes a locking position where it lockingly engages with said inner surface of said outer tubular member.

24. The method of claim 23 wherein after forming the aperture at the bottom end of said inner tubular member, finish-plating the outer surfaces thereof.

25. In combination with a pair of telescoping members, one such member being an outer tubular member having an inner surface and the other being an inner member fittable and slidable inside of said outer tubular member and which is to be moved and locked in a position therein so it projects varying amounts from the outer member to vary the overall length thereof; the improvement wherein said combination includes means carried on said inner member for releasably locking said inner member approximately in any adjusted position within said outer tubular member so that the overall length of the telescoping members can be gradually progressively varied and locked into practically all adjustable positions, said means comprising locking means movable to a locking position where a first portion thereof makes a locking engagement with said inner surface of said outer member, and support means for said locking means pivotally supporting said locking means for inertial pivoting responsively to acceleration of said inner member in one direction into said locking position, said locking means being movable by the user into a release position where said first and other portions of said locking means do not lockingly engage said inner surface of said outer tubular member, so that said inner member may be moved by the user to a desired position in said outer tubular member.

26. In a system having a pair of telescoping members, one such member being an outer tubular member having an inner surface and the other being an inner member fittable and slidable inside of said outer tubular member and lockable by locking means over a substantially infinite range of positions, so that the overall length of the telescoping members can be gradually progressively varied and locked into practically all adjustable positions, the improvement comprising:

said locking means including latching means having one edge portion thereon configured for engagement with an interior wall surface of said outer member;

pivot-forming means disposed on said inner member and about which said latching means is pivotable and wherein said edge portion of said latching means is releasably pivotable into a position to make a frictional, locking, arresting engagement with said interior wall surface, said edge portion being configured to engage said interior wall surface at an angle thereto so that relative movement of said members in one direction of movement urges said edge-forming portion into frictional, locking, arresting engagement with said interior wall surface, and including means for operating said latching means out of said frictional, locking, arresting engagement so that said locking means moves relative to said interior wall surface, said system being adapted for use in installations wherein said inner and outer members are disposed upwardly extending, and including means for pivoting said edge portion to be rotated into said arresting locking engagement with said interior wall surface responsively to an accelerational downward urging of said inner member and to release said locking engagement responsively to upward urging of said inner member.

27. The system of claim 26 wherein said locking means includes first support means for supporting said latching means in a disengaged position under the force of gravity responsively to upward movement of said inner member after locking and second support means for supporting said latching means in a wall-engaging locking position responsively to said downward acceleration.

28. The system of claim 26 wherein said latching means include biasing means producing a biasing force generally independent of acceleration for assisting in urging said latching means into said arresting engagement with said inner wall surface.

29. The system of claim 26 wherein said biasing means includes magnet means for so assisting in urging said latching means into said arresting engagement.

* * * * *